United States Patent
Solomon et al.

(10) Patent No.: US 7,320,080 B2
(45) Date of Patent: Jan. 15, 2008

(54) POWER MANAGEMENT OVER SWITCHING FABRICS

(75) Inventors: Gary A. Solomon, Acton, MA (US);
Edward Butler, Chandler, AZ (US);
Joseph A. Schaefer, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 413 days.

(21) Appl. No.: 10/687,512

(22) Filed: Oct. 15, 2003

(65) Prior Publication Data
US 2005/0086549 A1    Apr. 21, 2005

(51) Int. Cl.
*G06F 1/26* (2006.01)
*G06F 1/32* (2006.01)

(52) U.S. Cl. .................. 713/320; 713/300; 713/310; 370/395.1; 370/395.6; 709/230; 709/238

(58) Field of Classification Search .......... 370/395.1, 370/395.6; 709/230, 238; 713/300
See application file for complete search history.

(56) References Cited

U.S. PATENT DOCUMENTS

| | | | | |
|---|---|---|---|---|
| 5,430,728 A | * | 7/1995 | Narayanan et al. | 370/404 |
| 5,473,679 A | * | 12/1995 | La Porta et al. | 379/201.05 |
| 5,915,119 A | * | 6/1999 | Cone | 713/310 |
| 6,393,025 B1 | * | 5/2002 | Merritt | 370/395.6 |
| 6,714,544 B1 | * | 3/2004 | Bosloy et al. | 370/395.1 |
| 6,760,793 B2 | * | 7/2004 | Kelley et al. | 710/52 |
| 6,772,269 B1 | * | 8/2004 | Kaganoi | 710/310 |
| 6,996,658 B2 | * | 2/2006 | Brocco et al. | 710/312 |
| 7,137,018 B2 | * | 11/2006 | Gutman et al. | 713/323 |
| 2003/0182415 A1 | * | 9/2003 | Vicard | 709/223 |

* cited by examiner

*Primary Examiner*—A. Elamin
*Assistant Examiner*—James F. Sugent
(74) *Attorney, Agent, or Firm*—Fish & Richardson P.C.

(57) ABSTRACT

A switching fabric handles transactions using a protocol that directs packets based on path routing information. Components participate in transactions using a protocol that issues packets based on physical location of a destination device over the switching fabric, by establishing a virtual link partner relationship between the components.

26 Claims, 5 Drawing Sheets

POWER MANAGEMENT OVER SWITCHING FABRICS

BACKGROUND

Advanced interconnect technologies such as point-to-point serial interconnect technologies are used to interconnect components. A switching fabric is an example of such an advanced interconnect. The so-called Advanced Switching (AS) architecture has been defined to promote maximum interoperability with components that implement the PCI® (Peripheral Component Interconnect) Express architecture, as defined by the PCI® Express Base specification (PCI Special Interest Group).

One element of the PCI Express architecture is its power management features. These features are essential for reducing energy consumption in desktop computers; provide long battery life for portable computers such as notebook computers, and thermal relief in systems that take advantage of PCI® Express' very high signaling rate coupled with the serial technology's ability to support dense system packaging.

DETAILED DESCRIPTION

Figure 1:
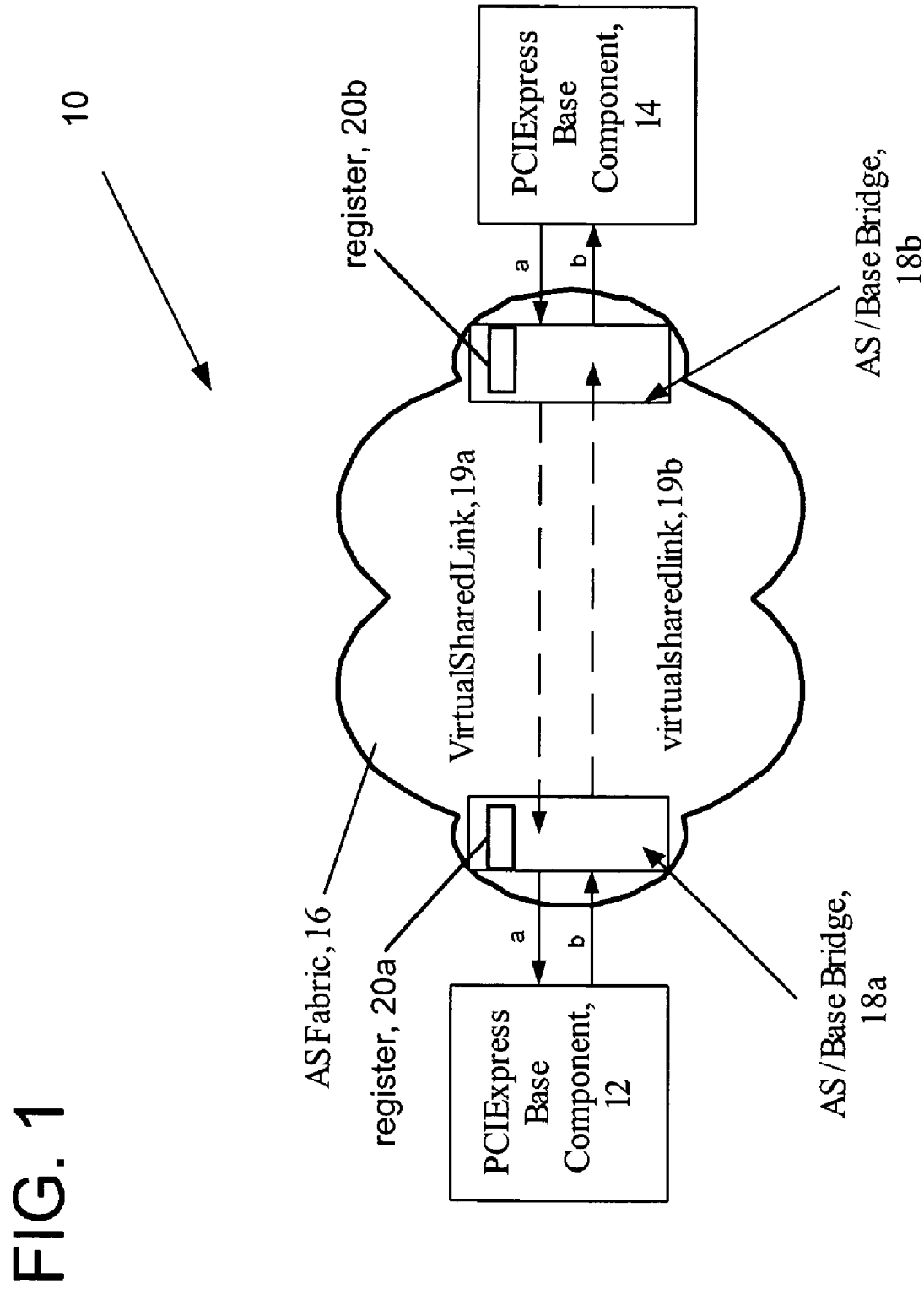
FIG. 1 is a block diagram of a system incorporating a switching fabric.

Referring to FIG. 1, a system 10 includes a first component 12 and a second component 14 that communicate, via a switching fabric 16, through a pair of respective bridges 18a and 18b that can reside on borders of the fabric 16. The bridges 18a and 18b establish a "Virtual Link Partner" (VLP) relationship between component 12 and component 14. Examples of the types of devices that the first and second components can be include computers and other components designed to be in compliance with the PCI Express Base specification, or any other type of point to point serial interconnect technology. The bridges 18a and 18b each include a Data Link Layer Packet Protocol (DLLP) "virtualization" control register 20a, 20b respectively.

In PCI Express Power Management, the Data Link Layer Packet protocol (DLLP) is used in establishing a power management state of a given link that is shared by two "link partners." When exchanging PCI Express Base power management Data Link Layer Packet (PM DLLP) traffic through switching fabric 16, the power management scheme treats the entire fabric 16 along the path between the two components 12 and 14 as a single "virtual link" that the two end components share as "virtual link partners."

The system 10 facilitates transmission of DLLP packets or other protocol packets that are directed based on having a address of a physical location, e.g., a physical memory address data, of a destination (i.e., that do not possess routing information in a header) over a switching fabric that directs traffic, (i.e., packets) based on routing information in a header. The DLLP protocol can be considered as a point-to-point type protocol. The process described below virtualizes DLLP packets that do not possess any routing information. An example of the application of this scheme will be described by exchanging of PCI Express base Power Management Data Link Layer Packets (PM DLLP). Other examples and applications are possible.

In a standard PCI Express read and write, packets are tunneled through a switching fabric and bridges have tables that associate given physical addresses received with a routing path that is appended to the packet before routing the packet through the fabric. In the case of DLLPs there is no indication of where the packet should be sent. The DLLP protocol assumes that the other end of the link is the destination for the packet.

The process "virtualizes" the transfer of DLLP packets to the far side of the fabric 16 by receiving the DLLP packet on one side of the fabric 16, and informing a far side bridge, e.g., bridge 18a (through path routed event packets that are not DLLPs) that a DLLP was received. The virtualization is provided since a DLLP packet is not actually sent across the fabric 16 from bridge 18b to bridge 18a. Rather, a virtual DLLP is sent by way of a normally routed signaling indication that a DLLP packet was received by the bridge 18b. The signaling is interpreted as a DLLP packet by the receiving bridge 18a, so that the DLLP is effectively transmitted over the switching fabric 16.

Although virtualization of DLLP transport can be used for many applications, one application in particular where DLLP virtualization can be used is in support of a power management protocol, e.g., the PCI Express Power Management protocol.

Figure 2:
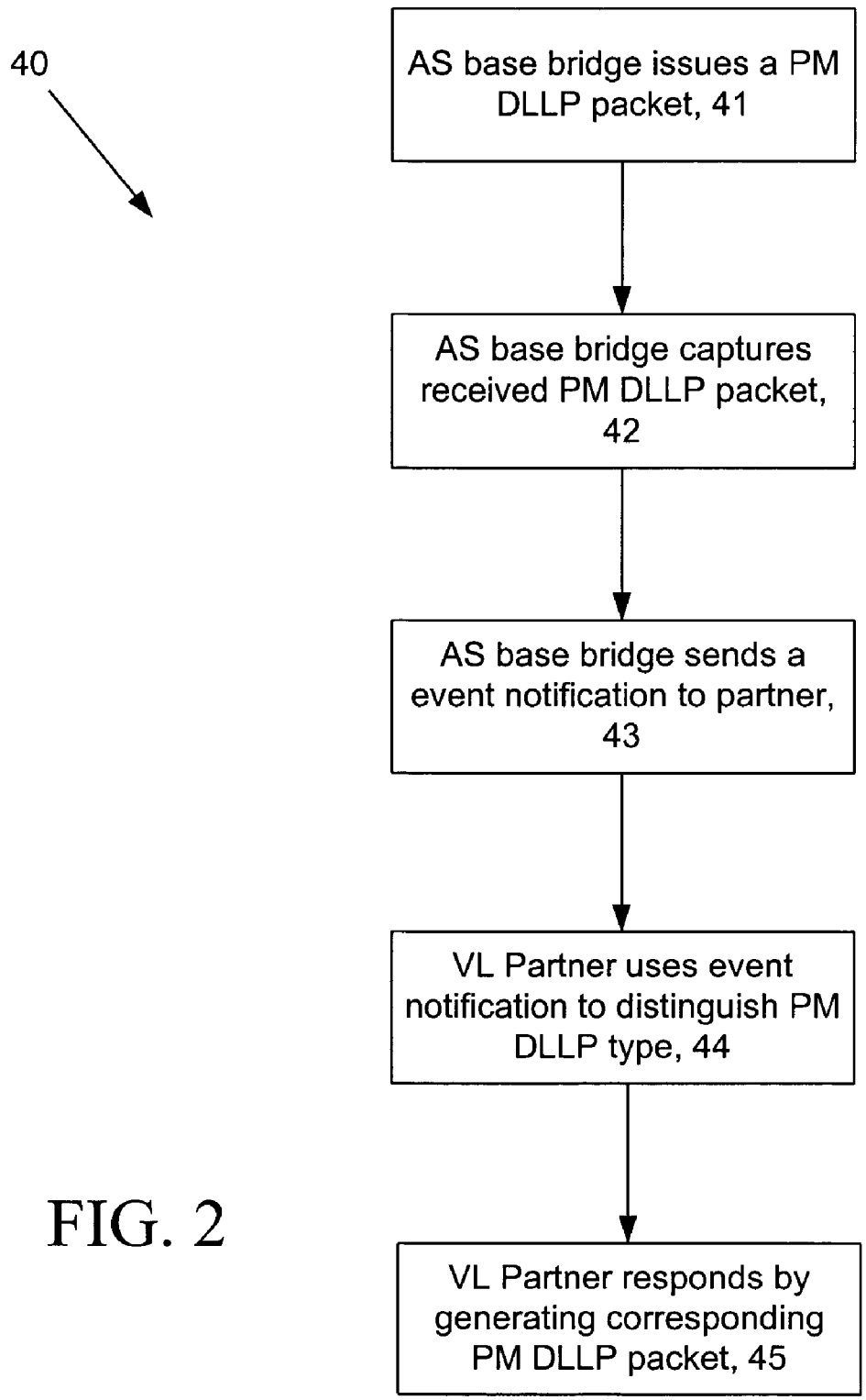
FIG. 2 is a flow chart that depicts a process to communicate transactions between components separated by a switching fabric.

Referring to FIG. 2, a process for establishing a virtual link relationship of DLLP communications over a switching fabric is shown. In the process 40, the PCI Express Base component 14 (Component B) issues 41 a Data Link Layer Packet protocol (DLLP) packet "a." The bridge 18b captures and decodes 42 the Data Link Layer Packet protocol (DLLP) packet "a" and sends 43 an "AS Event Notification" to the AS/Base Bridge 18a for the corresponding virtual link partner by writing into the DLLP Virtualization control register 20a (FIG. 1) within bridge 19a. The event notification data in the virtualization control register 20a is used by the bridge 18a to distinguish 44 the power management (PM) DLLP type of the packet. The virtual link partner's bridge here bridge 18a (according to FIG. 1) responds by generating 45 a corresponding Power Management DLLP packet "a," which is effectively the same packet that was issued by component 14. The bridge 12 propagates the DLLP packet "a" to the component 12. The same process can occur in the opposite direction for a DLLP "b" packet sent from component 12 to component 14.

In the PCI Express architecture, because of its high signaling rate, the architecture defines power savings mechanisms not only to program idle functions to low power states, but also to aggressively pursue power savings on physical links of the fabric. Endpoints whose Power State field is programmed to any non-D0 state, i.e., a fully active state, e.g., D1, D2, or D3 hot, are required to initiate a transition of their physical link to the L1 link state. In the PCI Express architecture there exists several different powered states where D0 is the fully active state, D1 and D2 are incrementally more power saving states and D3 is essentially an off state.

When an end node is programmed (also known as an endpoint in PCI Express Base spec) to a D-State (powered state) other than the fully active D0 state, the end node initiates a power transition of its shared link to a low power state. The difference between device PM and link PM control and communications mechanisms is that when programming the endpoint (device) the action is communicated using a transaction layer packet that is initiated by the fabric master (not shown) and explicitly routed to the intended endpoint device, e.g., the Root Complex (RC). The RC is the PCI Express component that resides at the 'root' of a PCI tree topology, connecting the host CPU to the I/O interconnect.

In contrast, the initiation of the link power saving state transition described above is a localized 'link management' transaction that originates at the end node and terminates at the other side of the shared link. This action is communicated using a "terminate at receiver" DLLP packet that does not have explicit routing information in the packet. However, the use of a DLLP packet is complicated by the presence of the switching fabric 16.

The response to a programmed transition of a destination endpoint's device power management state to any non-D0 state is a corresponding PM DLLP packet that is sent back to the destination endpoint's link partner by the destination endpoint. This PM Message DLLP packet acknowledges that the D-State transition has completed and serves to initiate a change in the shared link's power state. For example, if a destination endpoint is transitioned to the "D3 hot state", the destination endpoint, in turn, sends a PM_Enter_L1 DLLP to its link partner initiating power savings on their shared link as well. Once all outstanding link traffic has been accounted for, the other link partner responds with another DLLP packet (PM_Request_ACK) that signifies to the destination that it is now safe to fully transition its link to the L1 low power state. Other PM DLLPs are sent between link partners under different conditions in accordance with PCI Express Power Management protocol.

In the arrangement shown above, the source component 12 and destination component 14 are geographically separated by the AS fabric 16. The AS fabric 16 becomes an essentially transparent part of a single "virtual" base compatible link that connects the base source and destination components. This connection is accomplished by providing a configuration for the bridges 18a, 18b so that, when programmed accordingly, the bridges 18a, 18b respond with an appropriate PM DLLP packet on the PCI Express base fabric side of the bridge to the respective PCI Express compatible component, as illustrated above.

In the case where the indicated DLLP packet is required to be continually issued (i.e., beaconed) until observing some protocol defined behavior on the receive link, a single received indication of an event of that nature may cause the bridge to continually reissue the DLLP packet in accordance with PM protocol.

The power management features provide a solution for DLLP packet communications between components, e.g., PCI Express components, which happen to be separated by a switching fabric. This so called "virtualization" of DLLP communications enable robust power management between PCI Express Base components that use a switching fabric for the interconnect.

Special considerations exist when there is more than one far side I/O sub-tree.

Figure 3:
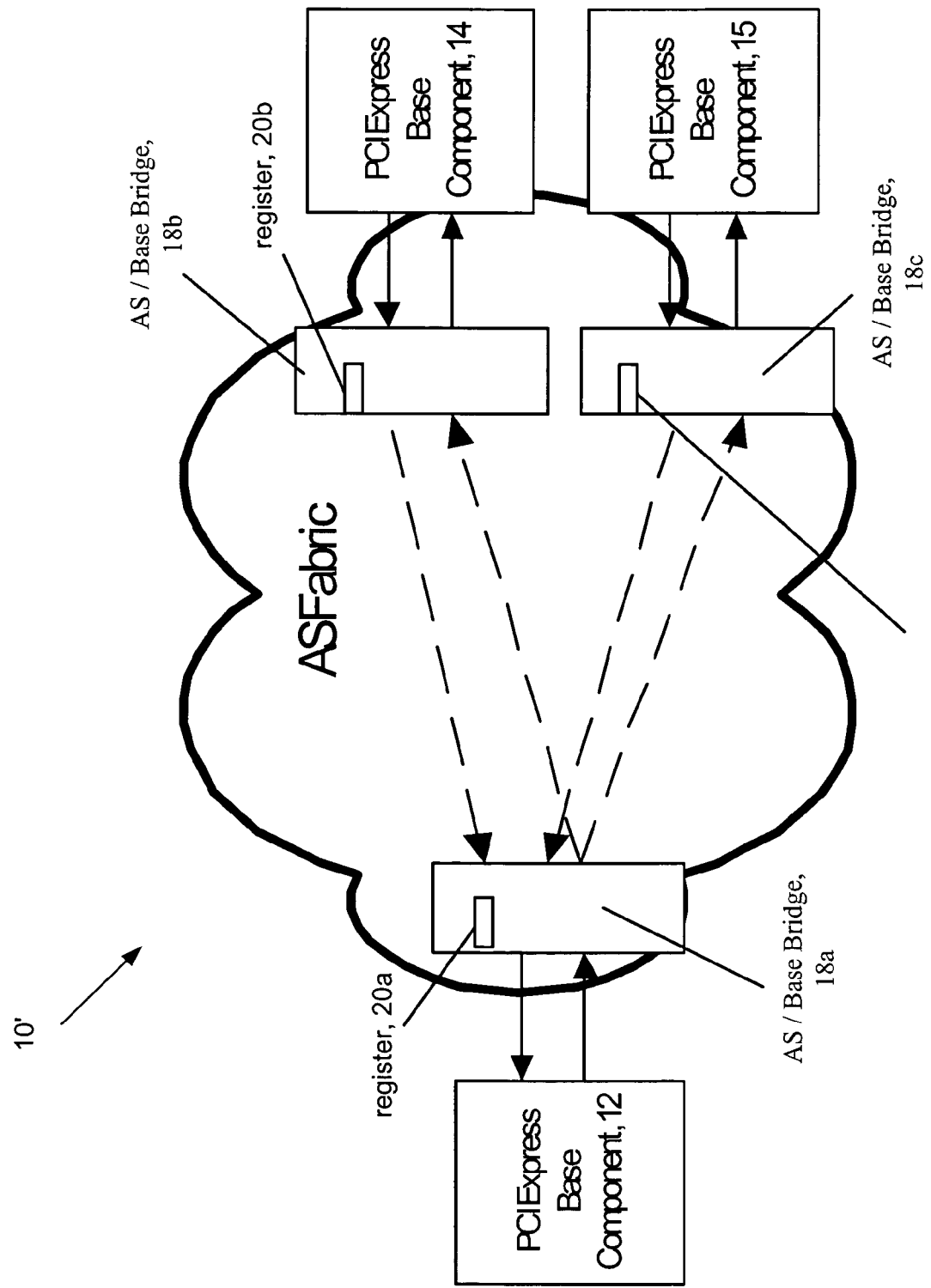
FIG. 3 is a block diagram of a system incorporating a switching fabric with multiple downstream components coupled to the fabric.

Referring to FIG. 3, another system 10' includes a first component 12 and a second component 14 that communicates via a switching fabric 16 through a pair of AS/Base bridges 18a and 18b. System 10' also includes a third component 15 that communicates via the switching fabric 16 through a pair of AS/Base bridges 18a and 18c with component 12. The bridges 18a, 18b and 18c establish a "Virtual Link Partner" (VLP) relationships between components 12 and 14, and component 12 and 15, respectively. Specifically, the three bridges coupled through the AS fabric form a virtual PCI Express base switch with respect to PM DLLP communications. The bridges 18a, 18b and 18c each include DLLP virtualization control registers 20a, 20b and 20c respectively.

To establish a "Virtual Link Partner" (VLP) relationship a bridge, e.g., bridge 18a conducts a PM DLLP protocol transaction with its far end sub-trees as though it, the bridge 18a was a base switch's downstream port. That is, when conducting PM DLLP communications to lower the power state of a link in a configuration with more than a single pair of virtual partners, components 14 or 15 initiate a link power management state change by sending a PM DLLP packet towards the RC component 12 (i.e., in the upstream direction). When a downstream component e.g., 14, requests that the link be brought to a lower PM state, the link on the far side closest to the RC (component 12) makes the transition of its link only after all downstream PCI Express components, e.g., components 14 and 15 have already been programmed to low power D-state and have both issued DLLP "L1" link state entry requests. This policy ensures that any common path leading to the root complex (RC) for example, system memory (not shown) will not transition to a low power state unless all other components that share that path are already in the low power state.

This policy also ensures that if one component, e.g., component 14 goes to sleep, that the common link that connects an active component, e.g., active component 15 does not go to sleep with it. In these configurations when a downstream component makes a request, the link connecting it to the near side bridge goes to power state L1, and the near side bridge (furthest from the RC) sends a notification of this power state change to the far side bridge (closest to the RC), while the RC's link stays awake. The link stays awake until component 15 sends a request to transition to the L1 with the bridge closest to the RC.

The PM DLLP protocol transaction is used to prevent a shared link between a component, e.g., component 12 and its associated AS/Base Bridge 18a from transitioning to a non-L0 (on) state until all "Downstream" ports first transition to such a non-L0 state. The bridge 18a collects Downstream Initiated DLLPs and requests a Link State Transition when both ports, e.g., components 14 and 15 are at non-L0 state.

If a power management transaction is initiated by a far end component, i.e., towards a downstream I/O sub-tree this technique is not necessary since presumably the far end component will have knowledge of the states of all links.

Thus, a PM DLLP Event Notification is always sent to the AS/Base Bridge associated with the Root Complex, e.g., bridge 12 in FIG. 3. A RC side initiated PM DLLP accounts for far side I/O Sub-trees before transitioning a shared link between the corresponding AS/Base Bridge, and the corresponding base-side link partner to a non-L0 State. The upstream port's link remains open for traffic until all downstream ports' (far end sub-tree bridges) links are in the non-L0 state. Also, the root complex (RC) host bridge side bridge conducts PM DLLP protocol transactions with the far end sub-trees as though it was a base switch's downstream port. A shared Link between component 12 and AS/Base Bridge 18a goes to a non-L0 state when both "downstream" ports have transitioned to the non-L0 state. The RC-side bridge collects downstream initiated DLLPs and requests a link state transition when both are at a non-L0 state.

The actual D-State programming is performed by a fabric manager (not shown) using normal multi-hop routable packets, PI-4 packets. Power management event (PME) messages are communicated to the fabric manager using routable packets, PI-5 packets that signal events. Link PM state behaviors are tied to the programming of the Endpoint's D-State according to the following policy which is that endpoints whose power state field is programmed to any non-D0 state, i.e., D1, D2, or D3 hot, are required to initiate a transition of their physical link to the L1 link state.

With a point-to-point interconnect, such as PCI Express, power savings can be aggressive unlike where components are shared by a bus. The PCI Express architecture supports a device PM state management communication (software driven) where link state transitions are tied to software driven changes to device PM state, and a so called active state link power management capability (hardware driven) where if a device has been idle for a period of time, the device will place itself into a standby state on the link that allows the device to resume to an operative state quickly when needed.

The process can start by software running on a CPU (example of a Root Complex), determining that it wants to put a component into a power saving state. The CPU sends configuration transaction that is completely compatible with the PCI power management and the transaction is carried by the fabric to the component, to change the component's power state to D3 hot.

Figure 4:
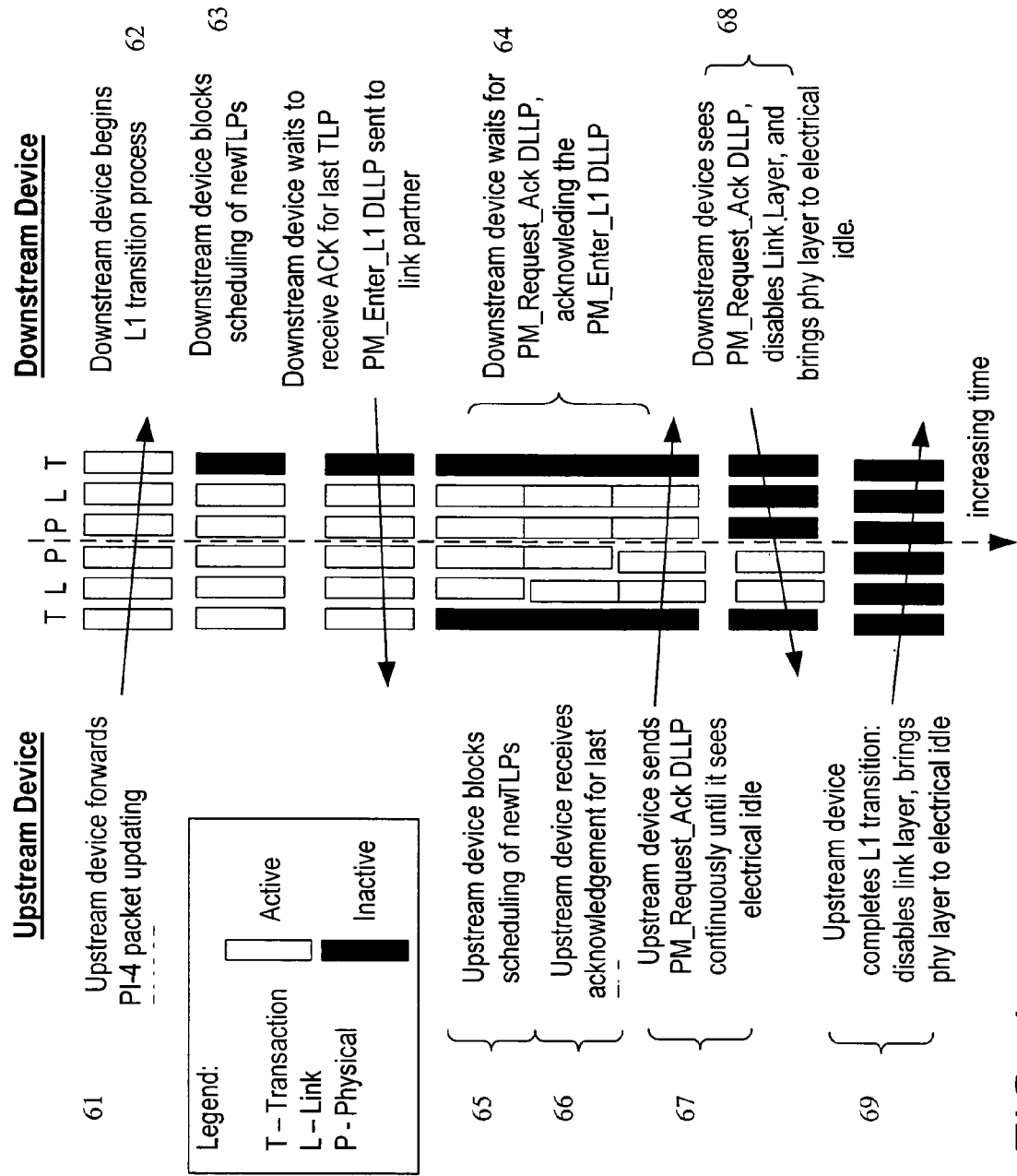
FIGS. 4 and 5 are diagrams that depict transaction flows in power management for a PCI environment.

Referring to FIG. 4, details 60 of a transaction flows encounter when entering the L1 Link State for the PCI power management are shown. The description in FIG. 4 shows an example of a DLLP protocol that is executed between a PCI Express component and an AS/Base bridge that physically share the same link. While the process executes, the virtualization of the DLLP is sent over to the RC side bridge via a PI-5 event packet. The description in FIG. 4 is an actual example of the DLLP protocol that occurs on both ends of a PCI Express base link, between a PCI Express component and the AS/Base bridge on the opposing end of the same link, e.g., between component 12 and bridge 18a, or component 14 and bridge 18b, and so forth.

An endpoint link is transitioned into the L1 state as a direct result of fabric power management software having programmed the endpoint into a lower power state (either D1, D2, or D3$_{hot}$).

The power management software sends 61 a transaction layer protocol (TLP) configuration request packet updating a power management control and status register (PMCSR) to change the downstream function's D-state, e.g., to a D1 state. In response, the endpoint suspends 62 the scheduling of any new TLPs, the endpoint waits 63 until it receives a link layer acknowledgement for any TLPs it had previously transmitted to its link partner. The endpoint may retransmit a TLP out of its link layer retry buffer if required to do so by link layer rules.

Once all of the downstream component's TLPs have been acknowledged 64 the downstream component transmits a PM_Enter_L1 DLLP to its link partner via the "Virtual Link Partner" (VLP) process described above. The endpoint sends the DLLP packet continuously until it receives a response from its link partner (PM_Request_Ack DLLP). While waiting for all of its TLPs to be acknowledged the downstream component is inhibited from initiating any new TLPs. The downstream component continues to accept TLPs and DLLPs from its link partner, and also continues to respond with DLLPs via the "Virtual Link Partner" (VLP) process described above as needed per Link Layer protocol.

Upon receiving 65 the PM_Enter_L1 DLLP the upstream component blocks the scheduling of any future TLPs. The upstream component waits 66 until it receives a Link layer acknowledgement for the last TLP it had previously transmitted to the endpoint. The upstream component may retransmit a TLP from its Link layer retry buffer if required to do so by the Link layer rules. Once all of the upstream component's TLPs have been acknowledged the upstream component sends 67 a PM_Request_Ack DLLP to the endpoint. The upstream component sends this DLLP continuously until it observes that its receive path, e.g., the serial interconnect is a dual simplex arrangement enter into the electrical idle state.

Once the endpoint has captured the PM_Request_Ack DLLP on its receive lanes (signaling that its link partner has acknowledged the L1 transition request), the endpoint disables 68 its Link layer and brings the upstream directed physical Link into the electrical idle state. When the endpoint's link partner observes its receive lanes enter the electrical idle state, endpoint's link partner stops sending PM_Request_Ack DLLPs, disables 69 its Link layer and brings its transmit lanes to electrical idle completing the transition of the Link to L1.

Either link partner can initiate exiting from the L1 State. An endpoint, i.e., the most downstream component, would initiate an L1 exit transition in order to bring the Link to L0 such that it may then inject a PME message. The upstream link partner would, on the other hand, initiate L1 exit to re-establish normal TLP and DLLP communications on the Link with the endpoint.

Figure 5:
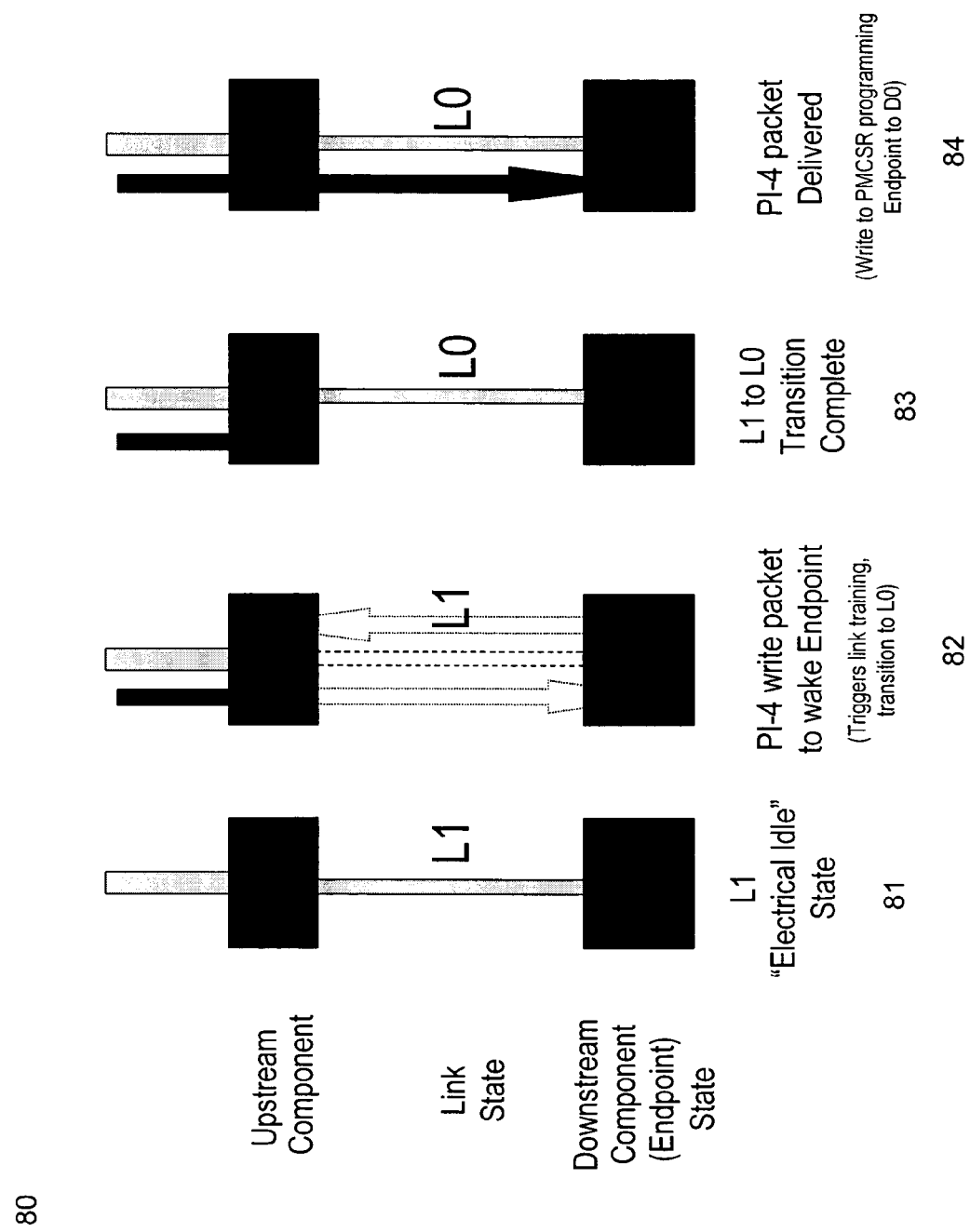

Referring to FIG. 5, a sequence 80 that would trigger the upstream component to initiate transition of the Link that is in the L1 state 81 to L0 state 84 is shown. The sequence includes fabric management (PM) software initiating 82 a PI-4 write packet targeting the "PowerState" field of the endpoint's power management control and status register (PM CSR not shown) to bring the endpoint back to the D0 state. The upstream component detects that a packet is targeted for a link that is currently in a low power state, and as a result, initiates 83 a transition of both directions of the link into the L0 state, resulting in the transition of the link to the L0 state. Once both the link is back to the active L0 state for receiving and sending traffic, the upstream port is able to deliver 84 the PI-4 write packet to the endpoint.

A number of embodiments have been described. Nevertheless, it will be understood that various modifications may be made. For instance, the techniques disclosed herein are applicable for any DLLP type communication that is not otherwise handled by a switching fabric. The technique is relevant to other types of communications, i.e., communications that are assumed to be point to point between link partners, rather than traffic that has explicit routing information that can move the packet to points beyond it immediate link partner. Accordingly, other embodiments are within the scope of the following claims.

What is claimed is:

1. A method comprising:
    initiating a transaction using a protocol that directs packets based on physical location of a receiving device over a switching fabric that directs packets based on path routing information in packets, by establishing a virtual link partner relationship between a first component and a second component coupled by a switching fabric, wherein the transaction is used in establishing a power management state of a given link that is shared by the first and second components, the power state of the first component transitions upon a transition of the power state of the second component, wherein the switching fabric includes a pair of bridges, each bridge including a protocol virtualization control register.

2. The method of claim 1 wherein initiating includes:
issuing by the first component a data link layer packet protocol packet to a protocol virtualization control register in the bridge that is associated with the first component.

3. The method of claim 2 wherein initiating further includes:
decoding the data link layer packet protocol packet issued by the first component and sending an event notification to a protocol virtualization control register in the bridge for the second component.

4. The method of claim 2 wherein initiating further includes:
writing an event notification into the protocol virtualization control register within the bridge for the second component.

5. The method of claim 2 wherein initiating further includes:
generating a corresponding DLLP packet; and
sending the corresponding DLLP packet to the second component.

6. The method of claim 1 wherein initiating comprises:
issuing by the first component a data link layer packet protocol packet to the bridge associated with the first component;
decoding the data link layer packet protocol packet issued by the first component and sending an event notification to the bridge for the second component; and
writing the event notification into a protocol virtualization control register within the bridge for the second component.

7. The method of claim 6 wherein initiating further includes:
generating a corresponding DLLP packet including data in the packet that was issued by first component; and
propagating the corresponding DLLP packet to the second component.

8. The method of claim 1 wherein the protocol is a Data Link Layer Packet protocol (DLLP) and the switching fabric is a Peripheral Component Interconnect (PCI) fabric.

9. The method of claim 1 wherein the transaction is for a protocol communication that assumes a point-to-point connection between link partners.

10. A computer program product residing on a computer readable medium for processing a packet comprises instructions to cause a computer to:
initiate a transaction by a first component to a second component over a switching fabric that requires routing information, wherein the transaction is used in establishing a power management state of a given link that is shared by the first and second components, the power state of the first component transitions upon a transition of the power state of the second component, wherein the switching fabric includes a pair of bridges, each bridge including a protocol virtualization control register; and
establish a virtual link partner relationship between the first component and the second component in response to the initiated transaction.

11. The computer program product of claim 10 wherein the instructions to initiate the transaction is a Data Link Layer Packet protocol (DLLP), the switching fabric is a Peripheral Component Interconnect (PCI) fabric.

12. The computer program product of claim 10 wherein the transaction is for a protocol communication that assumes a point-to-point connection between link partners.

13. The computer program product of claim 10 wherein instructions to initiate further comprises instructions to:
issue by the first component a data link layer packet protocol packet to a bridge associated with the first component.

14. The computer program product of claim 10 wherein instructions to initiate further comprises instructions to:
decode a data link layer packet protocol packet issued by the first component; and
send an event notification to a bridge for the second component.

15. The computer program product of claim 14 wherein instructions to initiate further comprises instructions to:
write the event notification into a protocol virtualization control register within a bridge for the second component.

16. The computer program product of claim 15 wherein instructions to initiate further comprises instructions to:
generate a corresponding DLLP packet, which is effectively the same packet that was issued by first component; and
propagate the corresponding DLLP packet to the second component.

17. The computer program product of claim 10 wherein instructions to initiate further comprises instructions to
issue by the first component a data link layer packet protocol packet to a bridge associated with the first component;
decode the data link layer packet protocol packet issued by the first component and sending an event notification to a bridge for the second component; and
write the event notification into a protocol virtualization control register within the bridge for the second component.

18. The computer program product claim 17 wherein instructions to initiate further comprises instructions to:
generate a corresponding DLLP packet, which is effectively the same packet that was issued by first component; and
propagate the corresponding DLLP packet to the second component.

19. A network system comprising:
a switching fabric that requires routing information in packets that traverse the fabric, wherein the switching fabric includes first and second bridges, each first and second bridge including a protocol virtualization control register;
a first component; and
a second component that communicates with the first component over the switching fabric by a protocol that is absent routing information with the first component and the second establishing a virtual link partner relationship to communicate using the protocol, wherein the transaction is used in establishing a power management state of a given link that is shared by the first and second components, the power of the first component transitions upon a transition of the power state of the second component.

20. The system of claim 19 wherein the protocol is a Data link Layer Packet protocol (DLLP), the switching fabric is a Peripheral Component Interconnect (PCI) fabric.

21. The system of claim 19 further comprising:
a device to store instructions to cause the first component to:

issue a date link layer packet protocol packet to a protocol virtualization control register in a first bridge that is associated with the first component.

22. The system of claim 21 wherein the first bridge includes instructions to cause the first bridge to:
   decode the data link layer packet protocol packet; and
   send an event notification to the second bridge for the second component.

23. The system of claim 21 wherein a second bridge associated with the second component includes instructions to cause the second bridge to:
   receive an event notification into a protocol virtualization control register within the second bridge for the second component; and
   generate a corresponding DLLP packet to the second component.

24. The system of claim 19 wherein the switching fabric comprises a first bridge associated with the first component and a second bridge associated with the second component wherein the second bridge includes a device to store instructions to cause the second bridge to:
   receive an event notification into a protocol virtualization control register within the second bridge for the second component; and
   generate a corresponding DLLP packet to the second component.

25. A network system comprising:
   a pair of network components; and
   a switching fabric coupling the network components, the switching fabric of the type that requires routing information in packets that traverse the fabric to couple the components and with the second component establishing a virtual link partner relationship to communicate using a protocol, wherein the transaction is used in establishing a power management state of a given link that is shared by the pair of network components, the power state of the first component transitions upon a transition of the power state of the second component, wherein the pair of components are computers coupled to a pair of bridges in the fabric, each bridge including a protocol virtualization control register.

26. The system of claim 25 wherein the protocol is a Data Link Layer Packet protocol (DLLP), the switching fabric is a Peripheral Component Interconnect (PCI) fabric.

* * * * *